US005745087A

United States Patent [19]

Tomiyoshi et al.

[11] Patent Number: 5,745,087

[45] Date of Patent: Apr. 28, 1998

[54] LIQUID CRYSTAL DISPLAY METHOD AND APPARATUS FOR CONTROLLING GRAY SCALE DISPLAY

[75] Inventors: Akira Tomiyoshi, Nara; Takafumi Kawaguchi, Yamatotakada, both of Japan

[73] Assignee: Sharp Kabushiki Kaisha, Osaka, Japan

[21] Appl. No.: 432,530

[22] Filed: May 1, 1995

[30] Foreign Application Priority Data

May 19, 1994 [JP] Japan .................................... 6-105771

[51] Int. Cl.[6] .............................. G09G 3/36; G02F 1/133

[52] U.S. Cl. ................................ 345/89; 345/87; 345/90; 349/33; 349/41; 349/46

[58] Field of Search ................................ 345/55, 87, 89, 345/90, 92, 93, 97, 103; 359/54, 55, 56, 57, 58, 59

[56] References Cited

U.S. PATENT DOCUMENTS

| | | | |
|---|---|---|---|
| 4,345,249 | 8/1982 | Togashi | 345/103 |
| 4,630,122 | 12/1986 | Morowaka | 359/56 X |
| 4,805,994 | 2/1989 | Miyajima | 345/87 X |
| 4,908,710 | 3/1990 | Wakai et al. | 345/103 X |
| 5,062,691 | 11/1991 | Tristani-Kendra et al. | 359/56 |
| 5,162,786 | 11/1992 | Fukuda | 345/100 |
| 5,196,738 | 3/1993 | Takahara et al. | 345/89 X |
| 5,233,447 | 8/1993 | Kuribayashi et al. | 359/56 |
| 5,253,093 | 10/1993 | Takeda et al. | 359/54 X |
| 5,541,747 | 7/1996 | Nishi et al. | 359/56 |

*Primary Examiner*—Raymond J. Bayerl
*Assistant Examiner*—Seth D. Vail
*Attorney, Agent, or Firm*—Nixon & Vanderhye, P.C.

[57] ABSTRACT

A gray scale signal duty ratio conversion section employs D flip-flops and AND gates so as to generate detection pulses for rises and falls of the gray scale signal T based on the gray scale signal T input from the control circuit and the clock signal CKT. Among the rise-detection pulses and fall-detection pulses, only the fall-detection pulses are delayed by the D flip-flop by one clock, and the delayed fall-detection pulses and the rise-detection pulses are input to an RS flip-flop so that the altered gray scale signal T' is obtained as an output of the RS flip-flop. The altered gray scale signal T' thus obtained is a signal whose HIGH period is longer than the input gray scale T by one clock. Thus, it is possible to compensate for the phenomenon associated with a TFT liquid crystal display device driven by the gray-scale driving method where a voltage applied to a liquid crystal capacitance may vary with the turning off of the TFT is from the voltage it was charged with. As a result, the liquid crystal material is prevented from being deteriorated, whereby the display quality and the reliability of the liquid crystal display device are improved.

13 Claims, 13 Drawing Sheets

FIG. 2
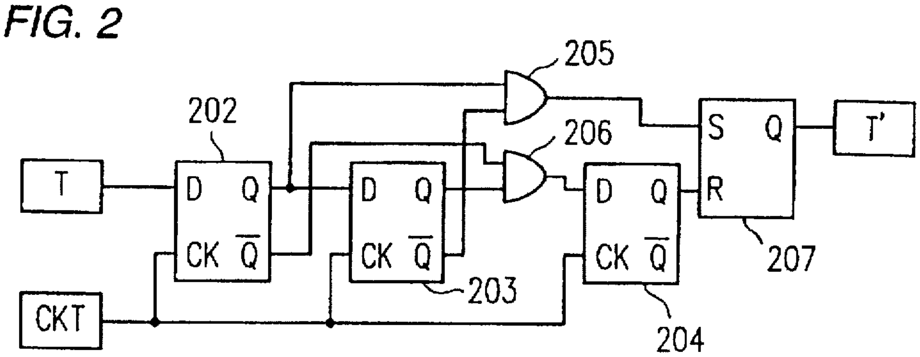
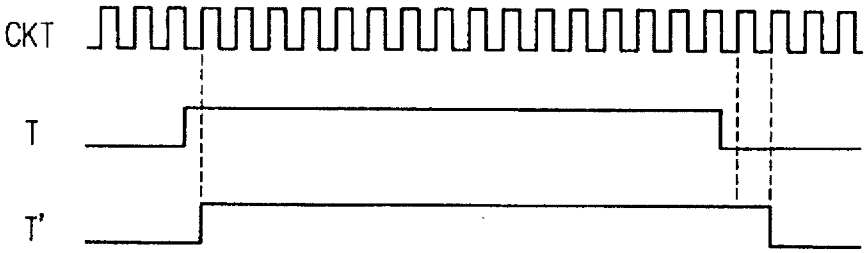
FIG. 3A
FIG. 3B
FIG. 3C

FIG. 5
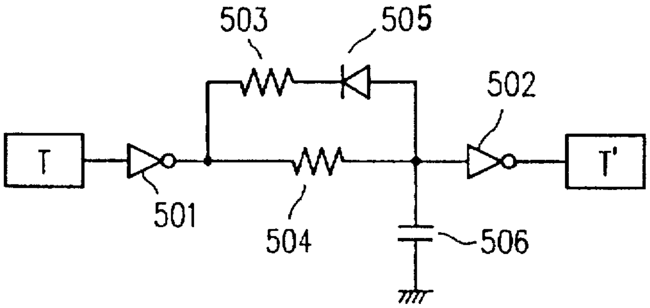
FIG. 6A
FIG. 6B
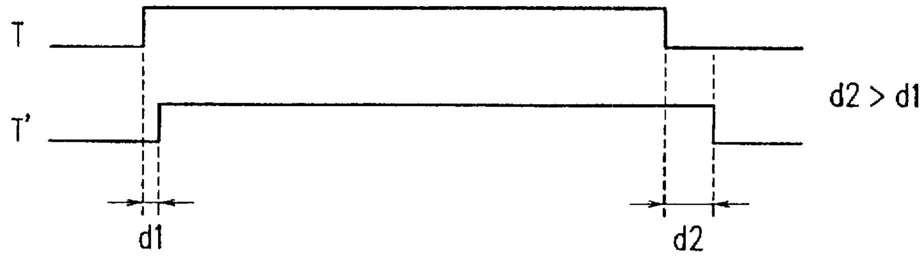

FIG. 8A
FIG. 8B
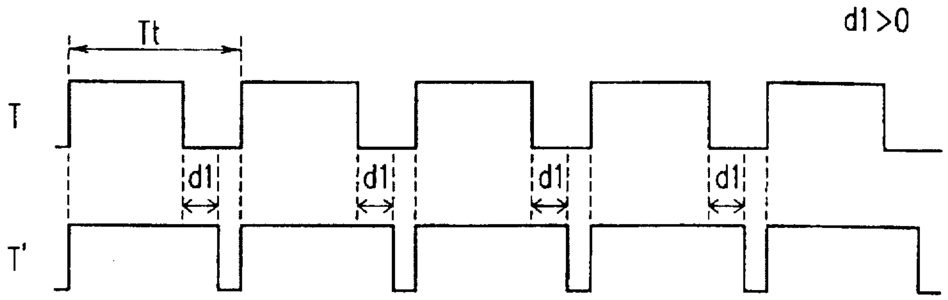
FIG. 9
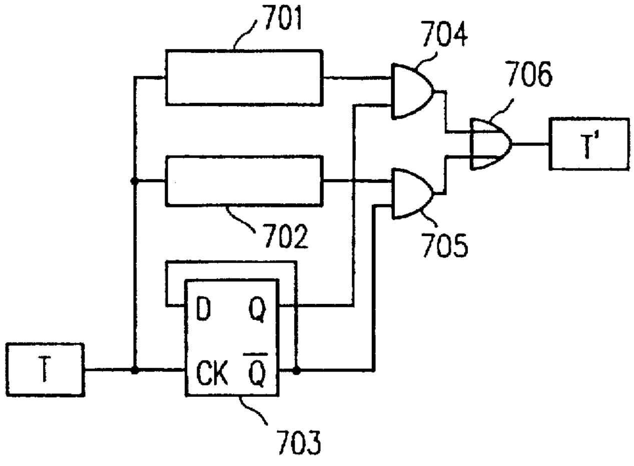

FIG. 10A
FIG. 10B
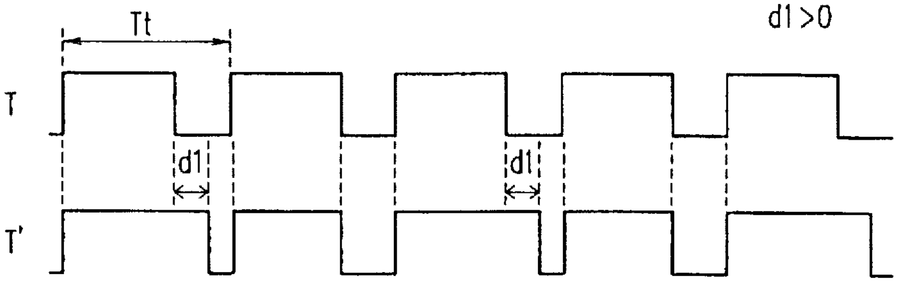
FIG. 11
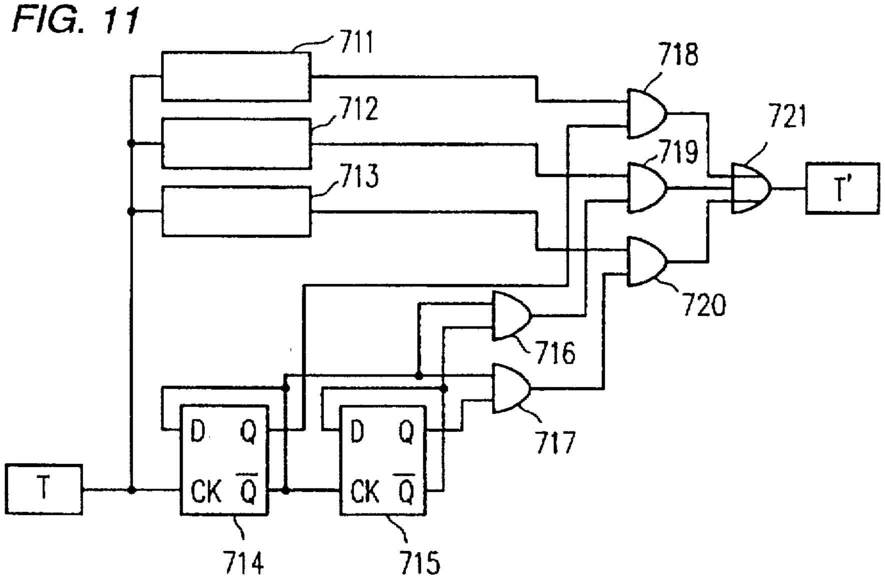

FIG. 12A
FIG. 12B
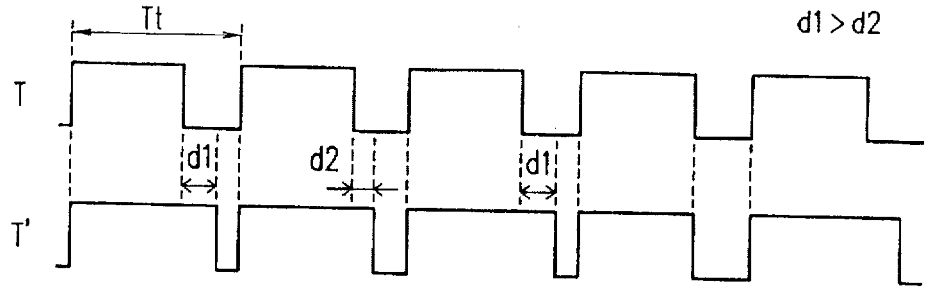
FIG. 13A
FIG. 13B
FIG. 13C
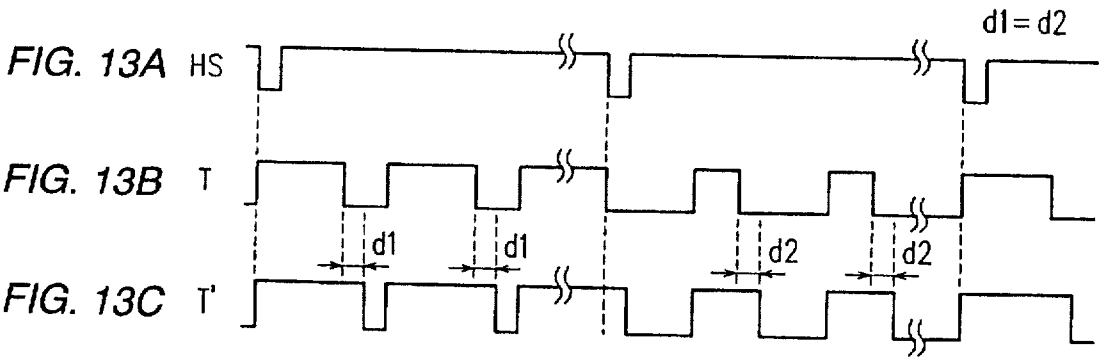
FIG. 14A
FIG. 14B
FIG. 14C
FIG. 14D
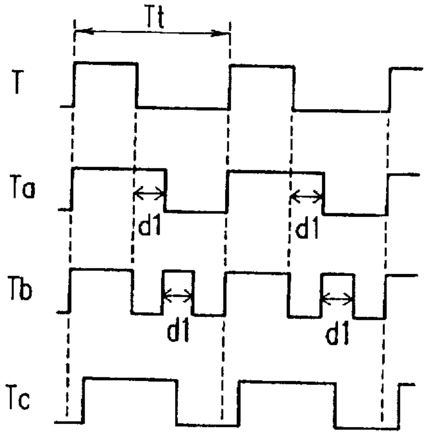

FIG. 19A
FIG. 19B
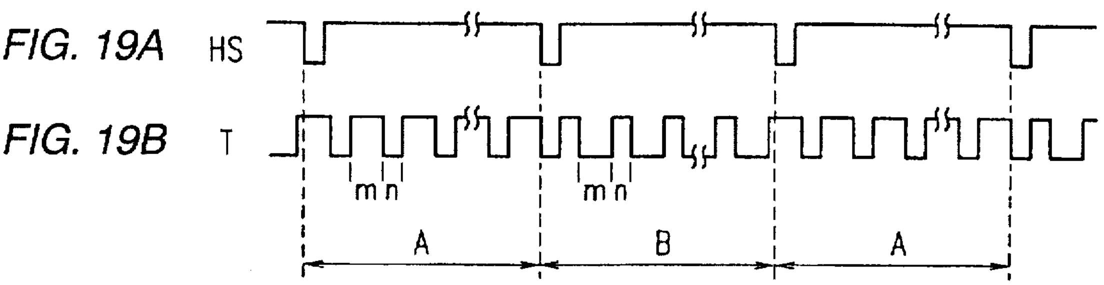
FIG. 20A
FIG. 20B
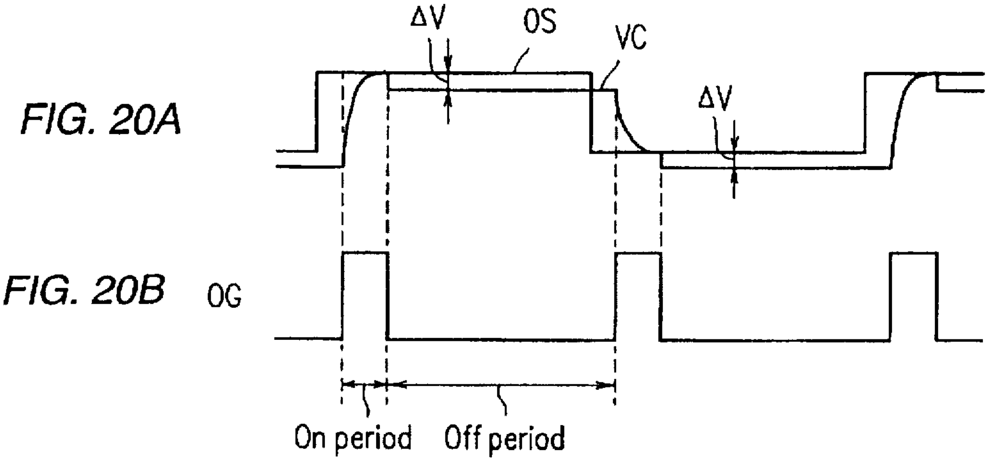

LIQUID CRYSTAL DISPLAY METHOD AND APPARATUS FOR CONTROLLING GRAY SCALE DISPLAY

BACKGROUND OF THE INVENTION

1. Field of the Invention

The present invention relates to a liquid crystal display device including pixels as load-capacitances arranged in a matrix shape and a method for driving the liquid crystal display device so as to realize gray scale display (hereinafter, such a driving method will be referred to as a "gray-scale driving method"). More particularly, the present invention relates to an active matrix type liquid crystal display device and a driving method thereof.

2. Description of the Related Art

One type of conventionally known liquid crystal display device is a so-called active matrix type liquid crystal display device incorporating TFTs (Thin Film Transistors), MIMs (Metal Insulator Metal) and the like. Methods for gray-scale driving such a liquid crystal display device are disclosed in Japanese Patent Application Nos. 5-325152 and 5-349930, for example. Hereinafter, these gray-scale driving methods will be described.

FIG. 15 is a block diagram showing a TFT liquid crystal display device 110. The liquid crystal display device 110 has an exemplary configuration including a matrix of 3 pixels×3 pixels. As shown in FIG. 15, the display device 110 includes a display section 107, and a driving circuit 108 for driving the display section 107. The display section 107 of the liquid crystal display device 110 includes two opposing substrates 100 and 101 with liquid crystal (as a display medium) sealed therebetween. On a face of the substrate 100 facing the liquid crystal, a plurality of pixel electrodes 103 are provided in a matrix shape. TFTs 102, which function as switching elements for driving the pixel electrodes 103, are provided on the substrate 100 so as to correspond to the respective pixel electrodes 103. One of a plurality of signal lines (data lines) 104 extending in parallel to one another is connected to a signal input (i.e., a source electrode) of each TFT 102. One of a plurality of scanning lines (gate lines) 105 extending in parallel to one another is connected to a control signal input (i.e., a gate electrode) of each TFT 102. The scanning lines 105 extend perpendicularly with respect to the signal lines 104.

On a face of the substrate 101 facing the liquid crystal, a common electrode (not shown) is formed so as to cover the entire surface thereof, or to correspond to each row of pixel electrodes 103, for example. A liquid crystal capacitance Clc, which contributes to the display, is created between the common electrode 101 and the a pixel electrode 103 with the liquid crystal functioning as a dielectric material.

The driving circuit 108 includes a control circuit 600 for outputting various control signals, a power supply circuit 400 for outputting source voltages $V_{SH}$, $V_{SL}$, a source driving circuit 200, and a gate driving circuit 300. Each scanning line 105 is connected to the gate driving circuit 300. The control circuit 600 receives a dot clock CK, a horizontal synchronization signal HS, a vertical synchronization signal VS, and a data signal DD from a external signal source (not shown).

The control circuit 600, the power supply circuit 400, and the signal lines 104 are connected to the source driving circuit 200. Thus, a gray scale signal and image data (to be described later) are input from the control circuit 600 to the source driving circuit 200, and the source voltages $V_{SH}$, $V_{SL}$, are supplied from the power supply circuit 400 to the control circuit 600. The source driving circuit 200 supplies driving voltages $S_1$, $S_2$, and $S_3$ to their corresponding ones of the signal lines 104 so as to drive each signal line 104. The gate driving circuit 300 supplies signals $G_1$, $G_2$, and $G_3$ to their corresponding ones of the scanning lines 105 so as to turn on and off each row of TFTs 102.

The exemplary gray-scale driving method described herein utilizes the fact that a region including each TFT 102 and a portion of the liquid crystal corresponding to each pixel has the properties of a low-pass filter owing to the ON-resistance Ron of the TFT 102 and the liquid crystal capacitance Clc. By so prescribing the source voltage for driving the display section 107 as to have only two potentials, i.e., $V_{SH}$ (high level) and $V_{SL}$ (low level), that is, by so prescribing the output value of each of the driving voltages $S_1$, $S_2$, and $S_3$ as to be a signal shown in FIG. 16 having a fundamental cycle of $T_r$, an amplitude of $V_{SH}-V_{SL}$, a duty ratio (i.e., an output time of $V_{SH}$: an output time of $V_{SL}$) of m : n, the liquid crystal capacitance Clc is charged with an average voltage equal to $(mV_{SH}+nV_{SL}) / T_r$.

In the above method, the liquid crystal capacitance Clc can be charged with a voltage having any value between $V_{SH}$ and $V_{SL}$ by adjusting the duty ratio m : n of the output driving voltages. As a result, gray scale display is realized.

FIGS. 17A–17P show waveforms of gray scale signals $T_0$ to $T_{15}$ (collectively referred to as gray scale signals T) corresponding to the respective levels of 16-tone gray scale. The gray scale signals T are signals having a duty ratio of m : n and input to the source driving circuit 200 from the control circuit 600. The above-mentioned driving voltages $S_1$, $S_2$, and $S_3$ are generated in the source driving circuit 200 based on the gray scale signals T and the source voltages $V_{SH}$ and $V_{SL}$ supplied from the power supply circuit 400, and are output to the signal lines 104.

FIGS. 18A–18P show waveforms of gray scale signals T corresponding to the respective levels of 16-tone gray scale adopting an interpolation gray scale method. FIG. 18 shows a case where fundamental gray scale signals $T_0$, $T_4$, $T_8$, $T_{12}$, and $T_{15}$ (collectively referred to as fundamental gray scale signals $T_i$) are combined with one another within a duration four times as long as the fundamental cycle $T_r$. According to general interpolation gray scale methods, the fundamental gray scale signals $T_i$ are combined with one another within a duration n times (where n is an integer) as long as the fundamental cycle $T_r$, so as to internally generate the other gray scale signals (interpolated gray scale signals) $T_r$, in the source driving circuit 200. For example, an interpolated gray scale signal $T_2$, which ranks between the fundamental gray scale signals $T_0$ and $T_4$, is realized by combining the fundamental gray scale signals $T_0$ and $T_4$ at a duration ratio of 2 : 2 within a duration f our times as long as the fundamental cycle $T_r$. Thus, a gray scale level of $T_2$, ranking between the fundamental gray scale signals $T_0$ and $T_4$, is realized. According to this method, the number of signals input from the control circuit 600 to the source driving circuit 200 can be reduced to 5 (i.e., the number of fundamental gray scale levels) from 16 (i.e., the number of all the gray scale levels).

In the actual driving of liquid crystal, an AC voltage is commonly used for driving the liquid crystal in order to prevent deterioration of the liquid crystal material. In the case of this gray-scale driving method, the duty ratio m : n is inverted at a predetermined cycle so as to invert the polarities of the driving signals $S_1$, $S_2$, and $S_3$. FIG. 19 illustrates an example of the polarity inversion. In FIGS.

19A–19B, the polarity of a gray scale signal T is inverted for every cycle of a horizontal synchronization signal $H_S$. During a period indicated as A, the duty ratio of the gray scale signal T is such that $V_{SH}$: $V_{SL}$=m:n. During a period indicated as B, the duty ratio of the gray scale signal T is such that $V_{SH}$ : $V_{SL}$=n:m. Thus, the polarity of the voltage applied to the liquid crystal capacitance Clc can be inverted.

The fundamental cycle is a unit for a gray scale signal. In FIGS. 17A–17P the frequency of the gray scale signal is the reciprocal number of the fundamental cycle.

In FIGS. 18A–18P the frequency of the gray scale signal is the reciprocal number of the four times the fundamental cycle. Generally speaking, the liquid crystal display unit, especially a signal path from a driving circuit of an active-type liquid crystal display unit to pixels, has a characteristics of a low-pass filter due to capacitance and resistance existing in the signal path. The pixels receive an average voltage, i.e., DC voltage, of a gray scale signal because the gray scale signal is filtered by the signal path. Therefore, the fundamental cycle is determined by device constants of a liquid crystal display unit, not by a response speed of the liquid crystal or a horizontal scanning period. Typically, the fundamental cycle is in the order of 500 ns, but is not limited to this specific value.

However, a liquid crystal display device incorporating TFTs is known to have a phenomenon where a change in the voltage of a scanning line occurring when a TFT is turned off causes the voltage of a pixel electrode to vary via a gate-drain capacitance Cgd parasitic to the TFT. As a result of this, the voltage applied to the liquid crystal capacitance Clc may vary from the voltage it was charged with. FIGS. 20A–20B are waveform diagrams for describing this phenomenon. In FIGS. 20A–20B, the liquid crystal capacitance Clc is charged with, as a voltage $V_c$ applied to the liquid crystal, a voltage equivalent to a driving voltage OS while a gate signal OG is in an ON state (i.e., the TFT is on), but the voltage reduces by ΔV from the driving voltage OS when the gate signal goes into an OFF state (i.e., the TFT is off) for the above-described reason. This phenomenon similarly occurs in the above-described gray-scale driving method as well, and therefore requires a certain countermeasure. However, conventional techniques provide no countermeasures against the phenomenon, so that the liquid crystal material may be deteriorated due to a voltage having a DC component being applied to the liquid crystal capacitance Clc.

SUMMARY OF THE INVENTION

A liquid crystal display device according to the present invention includes: a pair of opposing substrates with an electrooptical material sealed therebetween; a plurality of pixel electrodes arranged in a matrix shape on one of the pair of substrates; a plurality of switching elements, each of the plurality of switching elements being connected to one of the plurality of pixel electrodes; a plurality of row electrodes, each of the plurality of row electrodes being connected to a control terminal of one of the plurality of switching elements; a plurality of column electrodes, each of the plurality of column electrodes being connected to a signal input terminal of one of the plurality of switching elements; a row electrode driving circuit for sequentially selecting and driving each of the plurality of row electrodes; a digital gray scale signal generation circuit for generating a digital gray scale signal; a row electrode driving circuit for receiving the digital gray scale signal and a source input having output levels of high and low and for outputting a column electrode driving signal having output levels of high and low, the output levels of high and low of the column electrode driving signal being switched at a cycle determined by the digital gray scale signal; and a timing control circuit for controlling the row electrode driving circuit and the column electrode driving circuit, wherein a duty ratio between a high level period and a low level period of the column electrode driving signal is selected to be a different value from a duty ratio of the digital gray scale signal.

In one embodiment of the invention, the column electrode driving circuit includes conversion means for converting the duty ratio of the digital gray scale signal into a duty ratio between a high level period and a low level period of the column electrode driving signal different from the duty ratio of the digital gray scale signal.

In another embodiment of the invention, a plurality of digital gray scale signals are generated in the digital gray scale signal generation circuit, and the gray scale signal generation circuit includes conversion means for converting the duty ratio of each of the plurality of the digital gray scale signals into a duty ratio between a high level period and a low level period of the column electrode driving signal different from the duty ratio of the digital gray scale signal.

Alternatively, the liquid crystal display device includes: a pair of opposing substrates with an electrooptical material sealed therebetween; a plurality of pixel electrodes arranged in a matrix shape on one of the pair of substrates; a plurality of switching elements, each of the plurality of switching elements being connected to one of the plurality of pixel electrodes; a plurality of row electrodes, each of the plurality of row electrodes being connected to a control terminal of one of the plurality of switching elements; a plurality of column electrodes, each of the plurality of column electrodes being connected to a signal input terminal of one of the plurality of switching elements; a row electrode driving circuit for sequentially selecting and driving each of the plurality of row electrodes; a row electrode driving circuit for receiving a plurality of digital gray scale signals and a source input having output levels of high and low and for outputting a column electrode driving signal having output levels of high and low, the output levels of the column electrode driving signal being switched at a cycle determined by each of the plurality of digital gray scale signals; and a timing control circuit for controlling the row electrode driving circuit and the column electrode driving circuit, wherein the column electrode driving circuit includes conversion means for converting the duty ratio of each of the plurality of the digital gray scale signals into a duty ratio between a high level period and a low level period of the column electrode driving signal different from the duty ratio of the digital gray scale signal.

A method for driving a liquid crystal display device according to the present invention includes: a pair of opposing substrates with an electrooptical material sealed therebetween; a plurality of pixel electrodes arranged in a matrix shape on one of the pair of substrates; a plurality of switching elements, each of the plurality of switching elements being connected to one of the plurality of pixel electrodes; a plurality of row electrodes, each of the plurality of row electrodes being connected to a control terminal of one of the plurality of switching elements; a plurality of column electrodes, each of the plurality of column electrodes being connected to a signal input terminal of one of the plurality of switching elements; a row electrode driving circuit for sequentially selecting and driving each of the plurality of row electrodes; a digital gray scale signal generation circuit for generating a digital gray scale signal;

a row electrode driving circuit for receiving the digital gray scale signal and a source input having output levels of high and low and for outputting a column electrode driving signal having output levels of high and low, the output levels of high and low of the column electrode driving signal being switched at a cycle determined by the digital gray scale signal; and a timing control circuit for controlling the row electrode driving circuit and the column electrode driving circuit, wherein a duty ratio between a high level period and a low level period of the column electrode driving signal is selected to be a different value from a duty ratio of the digital gray scale signal.

Alternatively, the method for driving a liquid crystal display device according to the present invention includes: a pair of opposing substrates with an electrooptical material sealed therebetween; a plurality of pixel electrodes arranged in a matrix shape on one of the pair of substrates; a plurality of switching elements, each of the plurality of switching elements being connected to one of the plurality of pixel electrodes; a plurality of row electrodes, each of the plurality of row electrodes being connected to a control terminal of one of the plurality of switching elements; a plurality of column electrodes, each of the plurality of column electrodes being connected to a signal input terminal of one of the plurality of switching elements; a row electrode driving circuit for sequentially selecting and driving each of the plurality of row electrodes; a digital gray scale signal generation circuit for generating a digital gray scale signal; a row electrode driving circuit for receiving the digital gray scale signal and a source input having output levels of high and low and for outputting a column electrode driving signal having output levels of high and low, the output levels of high and low of the column electrode driving signal being switched at a cycle determined by the digital gray scale signal; and a timing control circuit for controlling the row electrode driving circuit and the column electrode driving circuit, wherein a duty ratio between a high level period and a low level period of the column electrode driving signal is altered within one cycle of the column electrode driving signal.

In one embodiment of the invention, the duty ratio is changed in a plurality of gray scale levels.

In another embodiment of the invention, a period in which the duty ratio is altered and a period in which the duty ratio is not altered are provided within a duration n times as long as one cycle of the column electrode driving signal, wherein n represents an integer.

In still another embodiment of the invention, the duty ratio is adjusted for every cycle within a duration n times as long as one cycle of the column electrode driving signal, wherein n represents an integer.

In still another embodiment of the invention, a timing for altering the duty ratio of the digital gray scale signal is continuous with a timing of a rise or a fall of the column electrode driving signal.

In still another embodiment of the invention, the duty ratio of the digital gray scale signal is inverted in synchronization with at least one of an output period, a horizontal output period, or a vertical output period of a display digital data signal, a direction of voltage variation and an amount of voltage variation of an average voltage of the column electrode driving signal for inverting the duty ratio of the digital gray scale signal, occurring for every cycle of the duty ratio inversion, are made equal before and after the duty ratio inversion.

Alternatively, the method for driving a liquid crystal display device according to the present invention includes: a pair of opposing substrates with an electrooptical material sealed therebetween; a plurality of pixel electrodes arranged in a matrix shape on one of the pair of substrates; a plurality of switching elements, each of the plurality of switching elements being connected to one of the plurality of pixel electrodes; a plurality of row electrodes, each of the plurality of row electrodes being connected to a control terminal of one of the plurality of switching elements; a plurality of column electrodes, each of the plurality of column electrodes being connected to a signal input terminal of one of the plurality of switching elements; a common electrode provided on the other one of the pair of substrates; a row electrode driving circuit for sequentially selecting and driving each of the plurality of row electrodes; a digital gray scale signal generation circuit for generating a digital gray scale signal; a row electrode driving circuit for receiving the digital gray scale signal and a source input having output levels of high and low and for outputting a column electrode driving signal having output levels of high and low, the output levels of high and low of the column electrode driving signal being switched at a cycle determined by the digital gray scale signal; and a timing control circuit for controlling the row electrode driving circuit and the column electrode driving circuit, wherein, when driving the liquid crystal display device by using the column electrode driving signal, the digital gray scale signal generated by the gray scale signal generation circuit is adjusted so as to have a duty ratio such that a voltage of the column electrode driving signal with respect to the common electrode has the same value in a period when the column electrode driving signal applied to one the plurality of pixels has a positive polarity or in a period when the column electrode driving signal applied to one the plurality of pixels has a negative polarity.

In one embodiment of the invention, a plurality of digital gray scale signals are generated in the digital gray scale signal generation circuit, and conversion means for converting the duty ratio of each of the plurality of the digital gray scale signals into a duty ratio between a high level period and a low level period of the column electrode driving signal different from the duty ratio of the digital gray scale signal is provided between the gray scale signal generation circuit and the column electrode driving circuit.

According to the present invention, the duty ratio of a column electrode driving signal can be adjusted to a desired value, as opposed to the conventional gray-scale driving methods, where the duty ratio of a digital gray scale signal is always identical with the duty ratio of a column electrode driving signal and cannot be altered. In other words, the voltage applied to the liquid crystal can be adjusted, so that an AC voltage having the same amplitude with respect to a common electrode during both positive periods and negative periods can be applied to each pixel electrode. As a result, the liquid crystal material can be prevented from being deteriorated.

Moreover, in the case where the duty ratio of the column electrode driving signal is adjusted by using digital devices, the number of circuit elements can be prevented from increasing by incorporating the circuit into a control circuit or a column electrode driving circuit.

Furthermore, the duty ratio of the column electrode driving signal can be arbitrarily adjusted within a duration n times (where n is an integer) as long as one cycle of a gray scale signal, so that the voltage applied to the liquid crystal can be more finely adjusted than adjusting the duty ratio uniformly over every cycle. In the case where the duty ratio of the digital gray scale signal is inverted in synchronization with at least one of an output period, a horizontal output period, or a vertical output period of a display data signal, the direction and amount of voltage variation of an average voltage of the column electrode driving signal due to the duty ratio adjustment, occurring for every cycle of the duty ratio inversion, can be made equal before and after the duty ratio inversion. As a result, only the DC component of the column electrode driving signal can be varied without varying the average voltage waveform of the column electrode driving signal.

Thus, the invention described herein makes possible the advantage providing a liquid crystal display device and a method for driving the same, in which the deterioration of liquid crystal material is prevented.

This and other advantages of the present invention will become apparent to those skilled in the art upon reading and understanding the following detailed description with reference to the accompanying figures.

BRIEF DESCRIPTION OF THE DRAWINGS

FIG. 2 is a circuit diagram showing an example of the gray scale signal duty ratio conversion section 201 shown in FIG. 1.

FIGS. 3A–3C are waveform diagrams for describing an operation of the gray scale signal duty ratio conversion section 201 shown in FIG. 2.

FIG. 5 is a circuit diagram showing an example of the gray scale signal delay section 500 shown in FIG. 4.

FIGS. 6A–6B are waveform diagrams for describing an operation of the gray scale signal delay section 500 shown in FIG. 5.

FIGS. 8A–8B are waveform diagrams of gray scale signals obtained in the case of implementing the circuits shown in FIGS. 2 and 5.

FIG. 9 is a circuit diagram showing an example of a gray scale signal conversion section of a liquid crystal display device according to an example of the present invention.

FIGS. 10A–10B are waveform diagrams for describing an operation of the gray scale signal conversion section shown in FIG. 9.

FIG. 11 is a circuit diagram showing an example of a gray scale signal conversion section of a liquid crystal display device according to an example of the present invention.

FIGS. 12A–12B are waveform diagrams for describing an operation of the gray scale signal conversion section shown in FIG. 11.

FIGS. 13A–13C are waveform diagrams showing exemplary output waveforms of the gray scale signal conversion section according to the present invention.

FIGS. 14A–14D are waveform diagrams showing other exemplary output waveforms of the gray scale signal conversion section according to the present invention.

FIGS. 19A–19B are waveform diagrams showing examples of conventional gray scale signals in the case where an average value of the gray scale signals is inverted in synchronization with a horizontal synchronization signal.

FIGS. 20A–20B are waveform diagrams for describing a phenomenon associated with a TFT liquid crystal display device where a voltage applied to a liquid crystal capacitance may vary with the turning off of the TFT from the voltage it was charged with.

DESCRIPTION OF THE PREFERRED EMBODIMENTS

Figure 1:
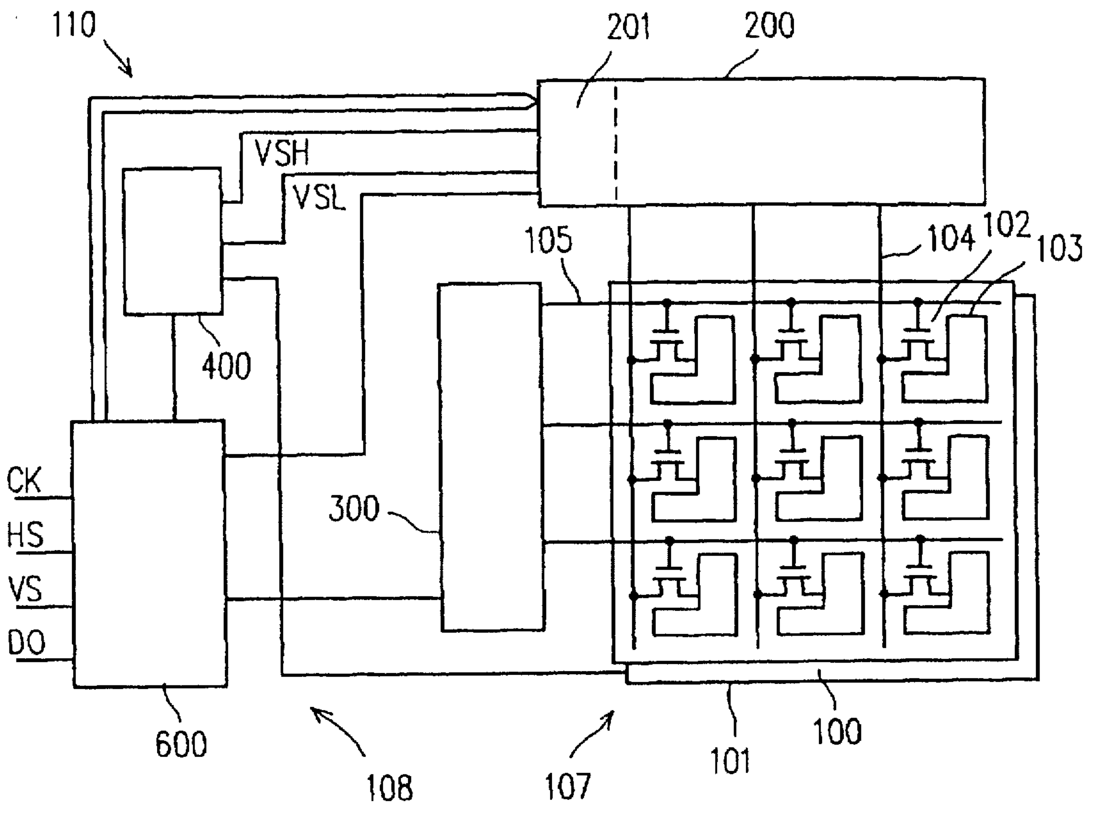
FIG. 1 is a block diagram showing a liquid crystal display device according to an example of the present invention.

In the drawings, like reference numerals designate like parts corresponding to each other.

Figure 15:
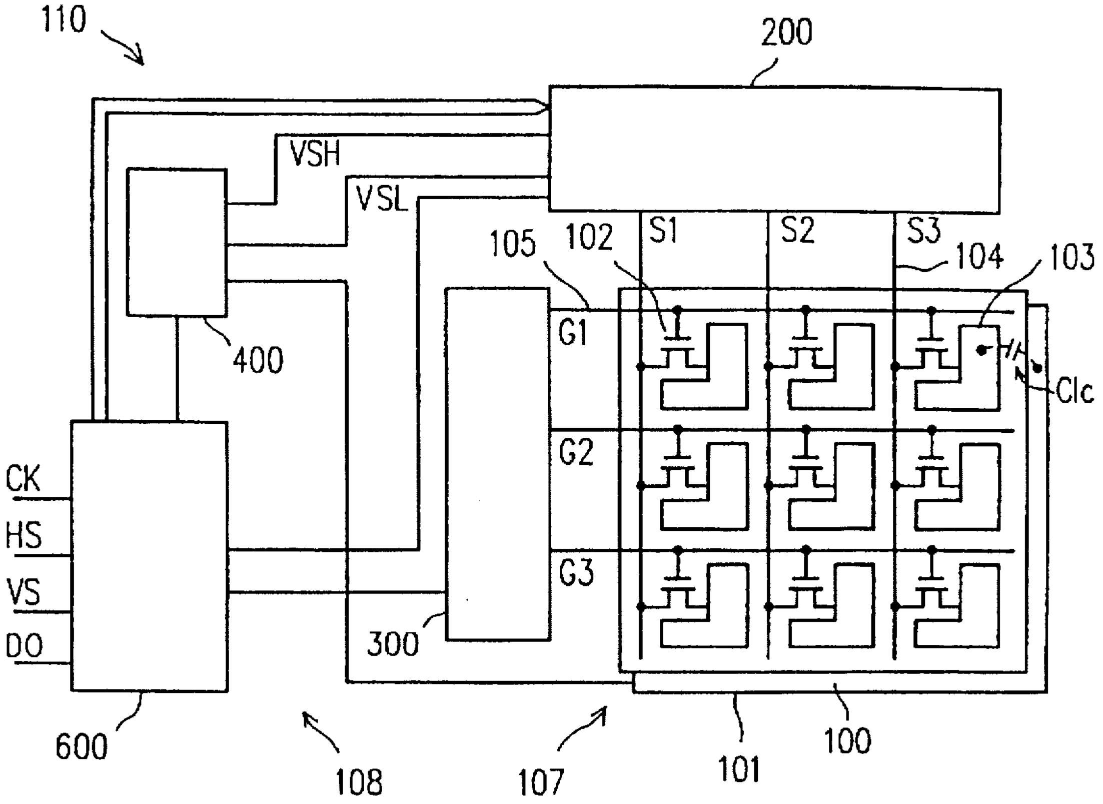
FIG. 15 is a block diagram showing a conventional liquid crystal display device.
Figure 16:
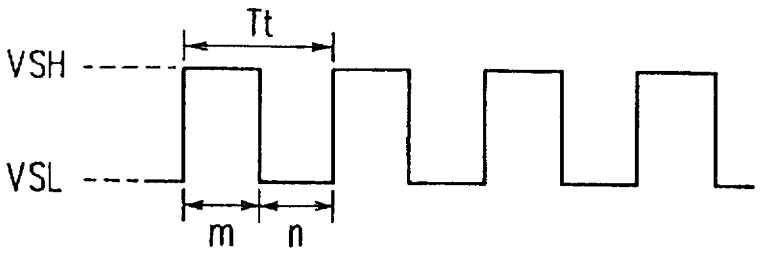
FIG. 16 is a waveform diagram showing a conventional column electrode driving signal.
Figures 17A, 17B, 17C, 17D, 17E, 17F, 17G, 17H, 17I, 17J, 17K, 17L, 17M, 17N, 17O, 17P:
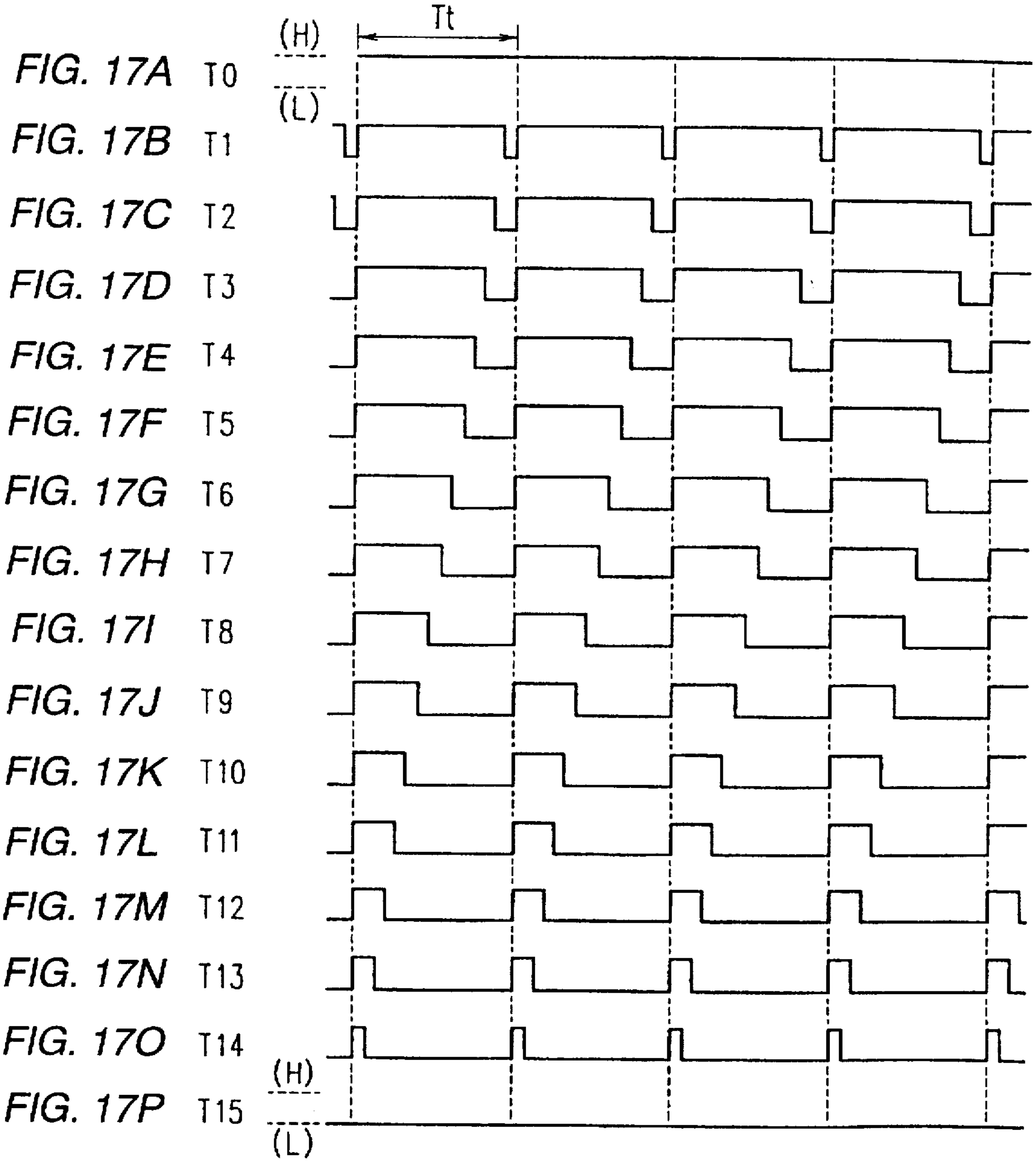
FIGS. 17A–17D are waveform diagrams showing gray scale signals corresponding to the respective levels of 16-tone gray scale.
Figures 18A, 18B, 18C, 18D, 18E, 18F, 18G, 18H, 18I, 18J, 18K, 18L, 18M, 18N, 18O, 18P:
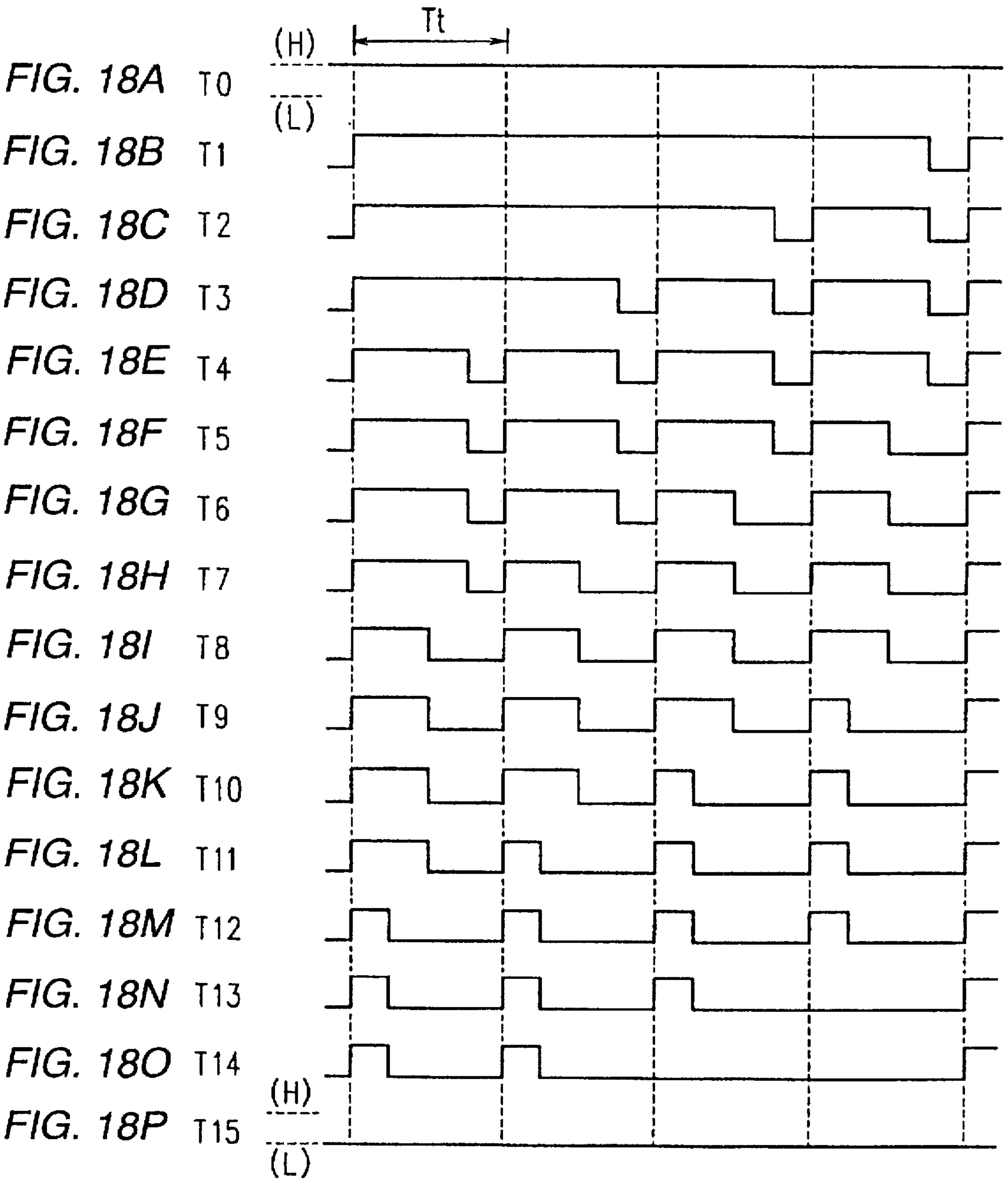
FIGS. 18A–18D are waveform diagrams showing gray scale signals corresponding to the respective levels of 16-tone gray scale in the case where an interpolation gray scale method is used for a source driving circuit.

FIG. 1 is a block diagram showing a liquid crystal display device 110 according to an example of the present invention. Constituent elements of the liquid crystal display device 110 in FIG. 1 which also appear in FIG. 15 are indicated by the same reference numerals in both figures. The configuration of the liquid crystal display device 110 according to the present invention is different from that of the conventional liquid crystal 110 (in FIG. 15) in that a source driving circuit 200 includes a gray scale duty ratio conversion section 201. The duty ratio conversion section 201 converts a duty ratio of a gray scale signal T input from a control circuit 600 into a desired value, and outputs the altered gray scale signal T' to a column electrode driving signal generation section (not shown) in the source driving circuit 200. An exemplary circuit configuration of the duty ratio conversion section 201 is shown in FIG. 2. FIGS. 3A, 3B, and 3C show examples of a clock signal CKT, the gray scale signal T, and the altered gray scale signal T'. In FIG. 2, D flip-flops 202 and 203 and AND gates 205 and 206 are employed to generate detection pulses for rises (i.e., rising edges) and falls (i.e., falling edges) of the gray scale signal T based on the gray scale signal T input from the control circuit 600 and the clock signal CKT. Among the rise-detection pulses and fall-detection pulses, only the fall-detection pulses are delayed by the D flip-flop 204 by one clock, and the delayed fall-detection pulses and the rise-detection pulses are input to an RS flip-flop 207 so that the altered gray scale signal T' is obtained as an output of the RS flip-flop 207. The altered gray scale signal T' thus obtained is a signal whose HIGH period is longer than the input gray scale T by one clock, as shown in FIGS. 3A, 3B, and 3C. In other words, by adopting this circuit configuration, the duty ratio of the gray scale signal T can be arbitrarily adjusted. By generating a column electrode driving signal by using the altered gray scale signal T' having an altered duty ratio, the average voltage of such a column electrode driving signal is increased by an equivalent of one clock in the case of this particular row of electrodes, as compared with the case where the column electrode driving signal is generated by using the gray scale signal T. The frequency of the clock signal CKT must be the same frequency as that of a clock signal used for the generation of the gray scale T by the control circuit 600, or a frequency which is obtained by multiplying the frequency for the gray scale T by an integer. Although the gray scale duty ratio conversion section 201 in the circuit shown in FIG. 2 employs only digital devices so as to alter the duty ratio of the gray scale signal T by one clock, the duty ratio of the gray scale signal T may be altered by any required value. The gray scale signal duty ratio conversion section 201 may include or consists exclusively of analog devices.

Thus, according to the present invention, it is possible to compensate for the phenomenon associated with a TFT liquid crystal display device driven by the gray-scale driving method where a voltage applied to a liquid crystal capacitance may vary with the turning off of the TFT from the voltage it was charged with. Thus, the liquid crystal material is prevented from being deteriorated, whereby the display quality and the reliability of the liquid crystal display device can be improved.

Moreover, the duty ratio conversion section 201 can be integrated in the column electrode driving circuit or the control circuit, so that the number of circuit elements can be reduced as compared with conventional devices.

Furthermore, the duty ratio alteration can be performed at an arbitrarily selected cycle, so that the average value of the column electrode driving signal can be finely adjusted.

By implementing the duty ratio conversion section 201 with an analog circuit, the average value of the column electrode driving signal can be adjusted in a stepless manner.

By prescribing the duty ratio of the digital gray scale signal in accordance with the characteristics of the liquid crystal display device, the liquid crystal material can be prevented from being deteriorated without altering the duty ratio of the gray scale signal in a separate step.

In the case where the duty ratios of a plurality of gray scale signals are altered, the alteration range of the duty ratio can be adjusted for each gray scale signal, whereby the average value of the column electrode driving signal can be optimized for each gray scale signal.

In the case where the duty ratio of the digital gray scale signal is inverted in synchronization with at least one of an output period, a horizontal output period, or a vertical output period of a display digital data signal, the direction and amount of voltage variation of an average voltage of the column electrode driving signal due to the duty ratio adjustment, occurring for every cycle of the duty ratio inversion, can be made equal before and after the duty ratio inversion so as to prevent the voltage applied to the liquid crystal from varying. As a result, the flickering of display and the deterioration of the liquid crystal material can be prevented.

Moreover, the current consumption of the device can be reduced by altering the duty ratio in a continuous manner with respect to the gray scale signal waveform before the alteration of the duty ratio of the digital gray scale signal.

Figure 4:
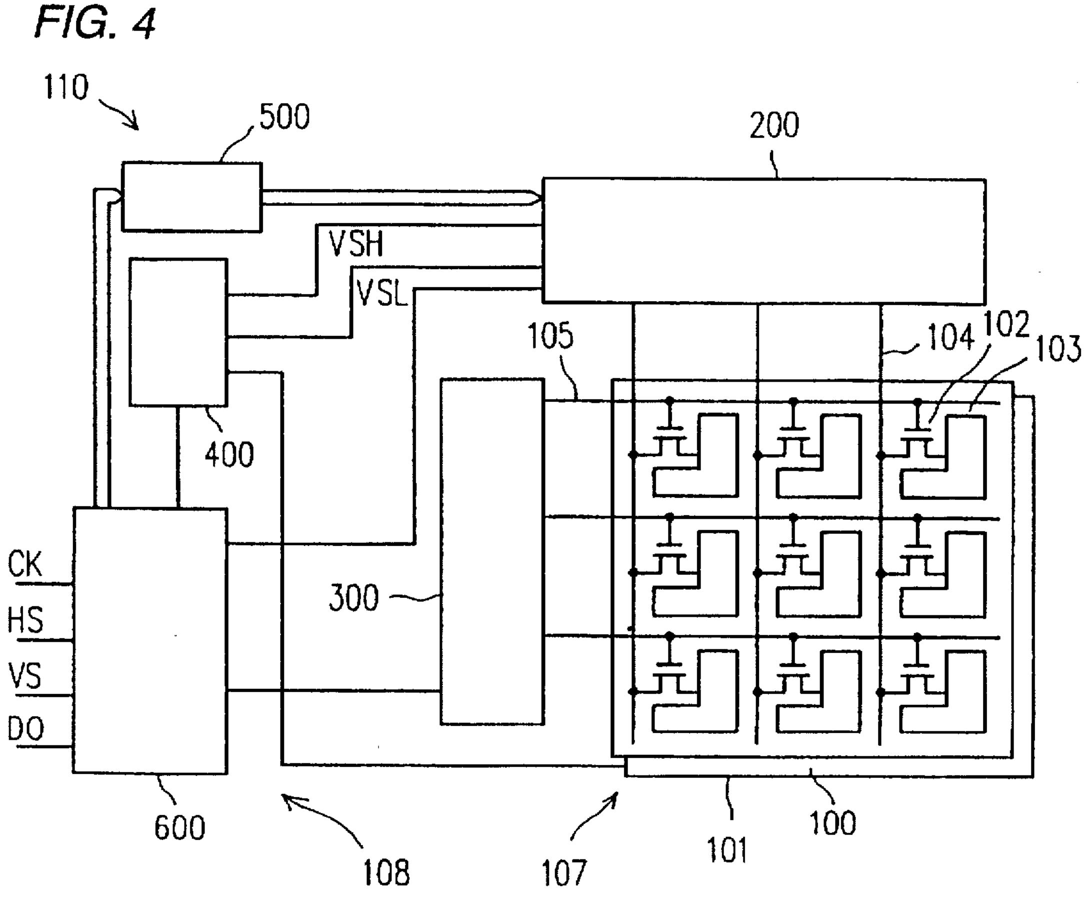
FIG. 4 is a block diagram showing a liquid crystal display device according to an example of the present invention.

FIG. 4 is a block diagram showing a liquid crystal display device 110 according to another example of the present invention. The configuration of the liquid crystal display device 110 is the same as that of the liquid crystal display device 110 in FIG. 15 except that a gray scale signal delay section 500 is inserted between a control circuit 600 and a source driving circuit 200. The gray scale signal delay section 500 alters the duty ratio of a gray scale signal T input from the control circuit 600 to be a desired value, and outputs the altered gray scale signal T' to the source driving circuit 200.

FIG. 5 illustrates an exemplary circuit configuration of the gray scale signal delay section 500. The gray scale signal delay section 500 shown in FIG. 5 includes inverters 501 and 502, resistors 503 and 504, a diode 505, and a capacitor 506. Both rises and falls of the gray scale signal T input from the control circuit 600 are delayed by the gray scale signal delay section 500.

FIGS. 6A–6B show examples of the gray scale signal T and the altered gray scale signal T'. As shown in FIG. 6, each rising edge of the gray scale signal T is delayed by a delay time $d_1$, whereas each falling edge of the gray scale signal T is delayed by a delay time $d_2$, the delay times $d_1$ and $d_2$ having different values from each other. Thus, the gray scale signal T' output from the gray scale signal delay section 500 has a duty ratio different from that of the gray scale signal T. In other words, by using the circuit shown in FIG. 5, the duty ratio of the gray scale signal T can be adjusted to a desired value. By generating a column electrode driving signal by using the altered gray scale signal T' having an altered duty ratio, the average voltage of such a column electrode driving signal is increased by an equivalent of the difference between the delay times (i.e., $d_2-d_1$) in the case of this particular row of electrodes, as compared with the case where the column electrode driving signal is generated by using the gray scale signal T. Although the gray scale signal delay section 500 shown in FIG. 5 employs both analog devices and digital devices so as to alter the duty ratio of the gray scale signal T, any other circuit configuration may be adopted as long as the duty ratio of the gray scale signal T can be varied. The gray scale signal delay section 500 may alternatively consist exclusively of analog devices or, as shown in FIG. 2, digital devices.

Figure 7:
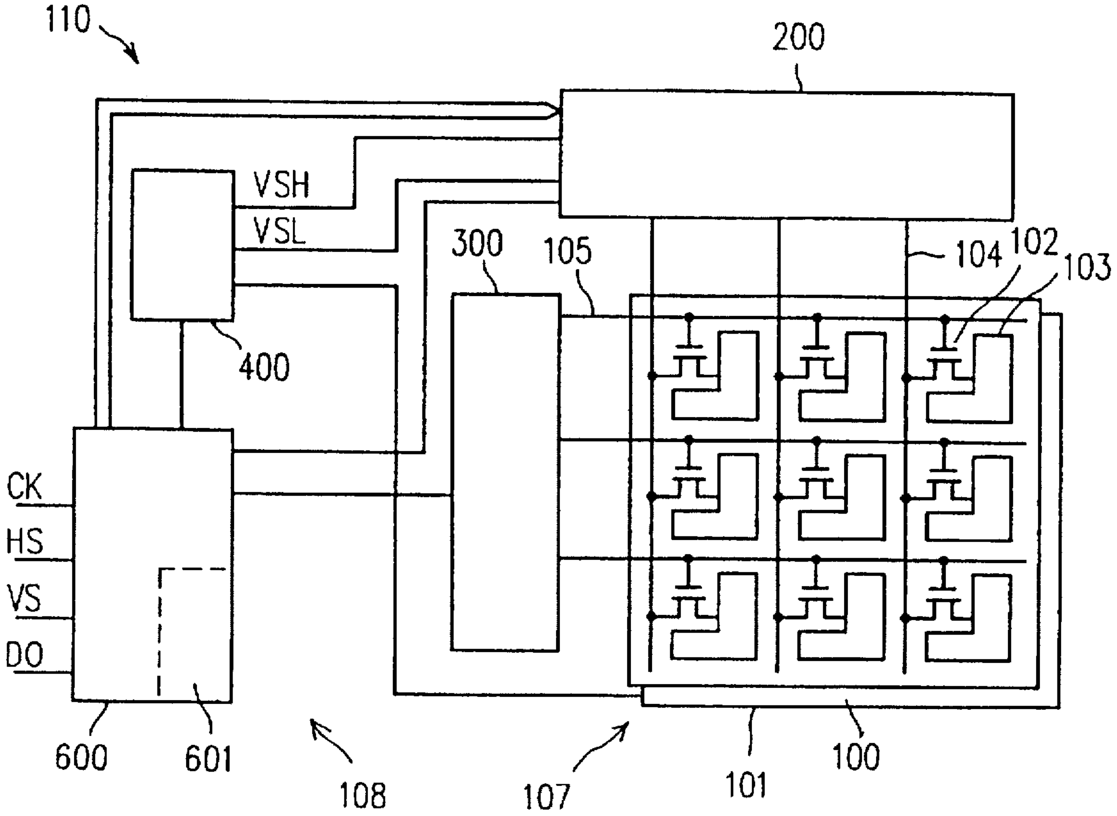
FIG. 7 is a block diagram showing a liquid crystal display device according to an example of the present invention.

FIG. 7 illustrates a block diagram of a liquid crystal display device 110 according to still another example of the present invention. The configuration of the liquid crystal display device 110 is the same as that of the liquid crystal display device 110 in FIG. 15 except that the control circuit 600 includes a gray scale signal setting section 601. The gray scale signal setting section 601 alters the duty ratio of a gray scale signal T generated in a gray scale signal generation portion (not shown) in the control circuit 600 to be a desired value, or alternatively sets the gray scale signal generation portion so as to generate a gray scale signal T having a desired duty ratio. By incorporating the gray scale signal setting section 601 in the control circuit 600, it becomes possible to arbitrarily alter the duty ratio of the gray scale signal T in the control circuit 600. By generating a column electrode driving signal by using the altered gray scale signal T' having an altered duty ratio, the average voltage of such a column electrode driving signal can be arbitrarily altered, as compared with the case where the column electrode driving signal is generated by using the gray scale signal T. The gray scale signal setting section 601 may be composed exclusively of digital devices, as shown in FIG. 2, incorporate both analog devices and digital devices as shown in FIG. 5, or consist exclusively of analog devices. However, since the gray scale signal generating portion for generating the gray scale signal T is likely to be composed exclusively of digital devices, it is preferable that the gray scale signal setting section 601 is also composed exclusively of digital devices. In this case, the gray scale signal generation portion and the gray scale signal setting section 601 can be implemented by using an integrated circuit, thereby reducing the number of circuit elements.

FIGS. 8A–8B show waveforms of the gray scale signal T and the gray scale signal T' obtained in the above-described examples. As shown in FIGS. 8A–8B, the above examples describe cases where the gray scale signal T' has the same duty ratio for every cycle $T_t$ of the gray scale signal T. That is to say, for every cycle $T_t$ of the gray scale signal T, the timing of the falling edge of the gray scale signal T is delayed by the delay time $d_1$, whereby generating the gray scale signal T'. If the duty ration conversion section for converting the duty ratio of the gray scale T includes analog devices, the duty ratio of the gray scale signal T can be varied in a stepless manner, which does not cause any problems. However, if the duty ratio conversion section for converting the duty ratio of the gray scale T is composed exclusively of digital elements, the duty ratio can only be set corresponding to one clock employed in the circuit. This may result in a problem in that the duty ratio cannot be set in a stepless manner or a gradual manner. In other words, the average voltage of the column electrode driving signal can only be set by steps of $(V_{SH}-V_{SL})/CT$, where CT represents the number of clocks in one cycle $T_f$ of the gray scale signal T, thereby requiring the steps to be finer (unless these steps are satisfactory).

One method for attaining finer steps is to set the unit duration for altering the duty ratio to be a duration n times (wherein n represents an integer) as long as one cycle $T_f$ of the gray scale signal T. An exemplary circuit for reducing the steps is shown in FIG. 9, with the waveforms of the gray scale signals T and T' shown in FIG. 10. The circuit shown in FIG. 9 includes duty ratio conversion sections 701 and 702 as described in FIG. 2 or 5, a D flip-flop 703, AND gates 704 and 705, and an OR gate 706, so as to generate the gray scale signal T' based on the gray scale signal T as shown in FIGS. 10A–10B.

Specifically, a signal whose polarity is inverted in synchronization with rises of the gray scale signal T is generated in the D flip-flop 703. The gray scale signal T is input to both duty ratio conversion sections 701 and 702. Either one of output signals of the duty ratio conversion sections 701 and 702 is selected by using the AND gates 704 and 705 and the OR gate 706 in accordance with an output signal of the D flip-flop 703, so as to be output as the gray scale signal T'. The resultant gray scale signal T' has two different duty ratios within every two cycles $T_f$ of the gray scale signal T as shown in FIGS. 10A–10B. In other words, cycles having the two duty ratios appear alternately for every cycle of the gray scale signal T. For example, once for every two cycles $T_f$ of the gray scale signal T, the timing of the falling edge of the gray scale signal T is delayed by the delay time $d_1$, whereby generating the gray scale signal T'. According to this method, the average voltage of the column electrode driving signal can be altered by steps of $(V_{SH}-V_{SL})/2CT$, which provides for finer setting than by the steps of $(V_{SH}-V_{SL})/CT$. More generally, cycles having a plurality of duty ratios which appear cyclically for every cycle may be utilized for the liquid crystal display device and the method for driving the liquid crystal display device according to the present invention.

FIGS. 10A–10B illustrate a case where no duty ratio conversion is conducted at one of the duty ratio conversion sections 701 and 702. It will be appreciated that, if a duty ratio conversion is performed at the one of the duty ratio conversion sections 701 and 702, its resultant waveform is output as the gray scale signal T' for every cycle. Although the duty ratio is altered for every two cycles of the gray scale signal T, the duty ratio alteration may be performed at larger cycles. A circuit configuration different from that shown in FIG. 9 may be adopted as well.

FIG. 11 shows an exemplary circuit for altering the duty ratio for every four cycles of the gray scale signal T. The circuit shown in FIG. 11 includes duty ratio conversion sections 711, 712, and 713 as described in FIG. 2 or 5, D flip-flops 714 and 715, AND gates 716 to 720, and an OR gate 721, so as to generate the gray scale signal T' based on the gray scale signal T shown in FIG. 12.

FIGS. 12A–12B illustrate the waveforms of the gray scale signals T and T' obtained by the exemplary circuit shown in FIG. 11. As shown in FIGS. 12A–12B, the first falling edge and the third falling edge of the gray scale signal T is delayed by a delay time $d_1$ and the second falling edge of the gray scale signal T is delayed by a delay time $d_2$, while the fourth falling edge of the gray scale signal T is not delayed. Thus, the duty ratio for the first cycle is the same duty ratio as the duty ratio for the third cycle of the gray scale signal T', the duty ratio for the second cycle is different from the duty ratio for the first cycle and the third cycle, and the duty cycle for the fourth cycle is an original (non-altered) duty ratio of the gray scale signal T. However, it is quite applicable to alter the duty ratio during each cycle. No problem arises even if the same duty ratio appears during two cycles or if the duty ratio is not altered in one of the cycles.

The interpolation gray scale method has been described earlier, in which fundamental gray scale signals are combined with one another within a certain duration (hereinafter, this duration will be referred to as the "combination cycle $T_s$"). In the case where the interpolation gray scale method is adopted and the duty ratio is altered for every duration (hereinafter referred to as the "duty ratio alteration cycle $T_d$") which is n times (wherein n represents an integer) as long as one cycle of the gray scale signal T, the combination cycle $T_s$ and the duty ratio alteration cycle $T_d$ should preferably satisfy the relationship $T_s=kT_d$ (where k represents a positive integer not including zero). The reason is that, if the duty ratio of an interpolated gray scale signal is altered at a cycle ($T_d$) longer one cycle of the interpolated gray scale signal, i.e., the combination cycle $T_s$, the frequency of the signal is determined in accordance with the duty ratio alteration cycle $T_d$. That is, the frequency of the signal becomes low, so that the column electrode driving signal is not sufficiently averaged out by the low-pass filtering properties of the ON-resistance $R_{on}$ and the liquid crystal capacitance Clc, thereby resulting in insufficient display quality of the liquid crystal display device. In general, the frequencies of the interpolated gray scale signals should be set to be at least a value at which a sufficient averaging effect or a sufficient smoothing is achieved by the low-pass filtering properties of the ON-resistance $R_{on}$ and the liquid crystal capacitance Clc. Therefore, the duty ratio alteration cycle $T_d$ should be at least equal to the combination cycle $T_s$ of the interpolated gray scale signals.

FIGS. 13A–13C show an example of the present invention where the duty ratio of the gray scale signal T is inverted in synchronization with horizontal output periods. It is assumed that, as shown in FIGS. 13A–13C, a delay time $d_1$ in a period (hereinafter referred to as "the first period") before the inversion of the gray scale signal T is equal to a delay time $d_2$ in a period (hereinafter referred to as "the second period") after the inversion of the gray scale signal T. In other words, when the duty ratio alteration in one of the first and second periods is such that the average voltage of the column electrode driving signal is increased (decreased) in that period, the duty ratio alteration in the other period is set to increase (decrease) the average voltage of the column electrode driving signal in that period. Thus, the average voltage is increased (decreased) by the same amount during both periods. In FIGS. 13A–13C, a positive delay time and a negative delay time correspond to increasing the average voltage and decreasing the average voltage, respectively. By setting the delay time $d_1$ equal to the delay time $d_2$, the same voltage determined in a designing process can be applied to the liquid crystal even if the duty ratio of the gray scale signal T is altered. As mentioned above, the duty ratio may be freely varied from cycle to cycle of the gray scale signal T as long as the amount and direction (increase or decrease)

of variation of the average voltage of the column electrode driving signal stay the same before and after the inversion(s) of the gray scale signal T. The inversion of the duty ratio of the gray scale signal T should be performed in synchronization with at least one of an output period, a horizontal output period, or a vertical output period of a display digital data signal. In such cases, the alteration of the duty ratio of the gray scale signal T is similarly performed in such a manner that the amount of duty ratio alteration is the same before and after the inversion(s) of the gray scale signal T.

It is applicable to alter the duty ratios of a plurality of gray scale signals. In this case, a plurality of circuit sections for altering the duty ratios of the gray scale signals are provided. These circuit sections may separately perform the alteration of the duty ratios of their respective gray scale signals. In general, the correction amount for the voltage applied to the liquid crystal caused by the above-described mechanism varies depending on the change in the liquid crystal capacitance, which in turn depends on the voltage applied to the liquid crystal. Therefore, it is impossible to appropriately compensate for a plurality of voltages applied to the liquid crystal by using the same correction amount, and it is necessary to adjust the correction amount depending on the gray scale level. In liquid crystal display devices, generally speaking, gray scale display is achieved by varying the voltages applied to the liquid crystal, so that a plurality of duty ratio conversion circuits are required for a plurality of gray scale signals, according to the present invention.

However, as the voltage applied to the liquid crystal increases, the correction amount required for the voltage applied to the liquid crystal decreases (or increases). For example, when every gray scale level admits of a duty ratio alterable range of 100, a correction equivalent to only about 10 may be required for a black display even if that of 90 is required for a white display. In other words, the correction ranges for the voltages applied to the liquid crystal may be set according to the voltage applied to the liquid crystal. For example, rather than allowing a correction range of 0 to 100 by steps of 10 for the whole gray scale level, it is preferable to set a correction range of 80 to 100 by steps of 2 for white displays and a correction range of 0 to 20 by steps of 2 for black displays. Thus, each voltage applied to the liquid crystal may be corrected within a limited range of correction but by finer steps, whereby more accurate correction can be performed for the voltages applied to the liquid crystal.

Moreover, assuming that black displays require the least correction amount for a voltage applied to the liquid crystal, the correction amount for a voltage applied to the liquid crystal on a next darker gray scale level is certain to become larger than that for the black displays, so that the minimum value of the correction range for this gray scale level can be utilized as the correction amount for the black displays. In other words, according to the present invention, the duty ratio conversion for the gray scale signals need not be performed separately for each gray scale signal, and it is possible to alter the duty ratio of one gray scale signal based on the alteration of the duty ratio of another gray scale signal.

According to the present invention, the duty ratio of an existing gray scale signal is altered by various methods. However, if the characteristics of the liquid crystal are known when designing the gray scale signal generation circuit, it is applicable to determine the duty ratio of the gray scale signal in accordance with the characteristics of the liquid crystal. The configuration of the liquid crystal display device in this case may be the same as that shown in FIG. 15. Since the duty ratio of the gray scale signal need not be altered, no circuit for achieving that function is required. However, if the characteristics of the liquid crystal should change, the relationship between the voltage applied to the liquid crystal and the correction amount for the voltage applied to the liquid crystal may change, so that some adjustment to the duty ratio is necessary. Thus, the duty ratio alteration circuit as described above may suitably be incorporated in the liquid crystal display device in this case as well.

FIGS. 14A–14D are waveform diagrams describing the alteration of the duty ratio of a gray scale signal T as mentioned above. In FIGS. 14A–14D, $T_a$ represents a gray scale signal whose duty ratio is altered by an amount $d_1$ in a portion continuous with the waveform of the gray scale signal T, and $T_b$ represents a gray scale signal whose duty ratio is altered by the amount $d_1$ in a portion not continuous with the waveform of the gray scale signal T. The gray scale signals $T_a$ and $T_b$ have the same duty ratio, presumably resulting in the same average voltage of column electrode driving signals. However, since the liquid crystal display device is driven in such a manner that the liquid crystal capacitance is charged and discharged by the frequencies of the gray scale signals, an increase in the frequency of a gray scale signal results in an increase in the driving power consumption. For example, although the gray scale signals $T_a$ and $T_b$ have the same frequency, the gray scale signal $T_b$ theoretically results in twice as large a number of charging/discharging of the liquid crystal capacitance as the gray scale signal $T_a$, indicating a larger amount of the driving power consumption with the gray scale signal $T_b$ than the gray scale signal $T_a$. Therefore, when the duty ratios of gray scale signals are altered, the power consumption of the liquid crystal display device can be reduced by ensuring that the altered gray scale signals have continuous waveforms with the original gray scale signals.

Although the gray scale signal $T_c$ shown in FIGS. 14A–14D rises and falls at different timings with respect to the gray scale signal T, the duty ratio of the gray scale signal $T_c$ itself is the same as that of the gray scale signal $T_a$. In such cases, no problem arises unless the difference of the rising edge timing between the gray scale signal T and the gray scale signal $T_c$ can be negligible.

Thus, according to the present invention, it is possible to compensate for the phenomenon associated with a TFT liquid crystal display device driven by the gray-scale driving method where a voltage applied to a liquid crystal capacitance may vary with the turning off of the TFT is from the voltage it was charged with. Thus, the liquid crystal material is prevented from being deteriorated, whereby the display quality and the reliability of the liquid crystal display device are improved.

Moreover, a duty ratio conversion section can be integrated in the column electrode driving circuit or the control circuit, so that the number of circuit elements is reduced as compared with conventional devices.

Furthermore, the duty ratio alteration can be performed at an arbitrarily selected cycle, so that the average value of the column electrode driving signal can be finely adjusted.

By implementing the duty ratio conversion section with analog devices, the average value of the column electrode driving signal can be adjusted in a stepless manner.

By setting the duty ratio of the digital gray scale signal in accordance with the characteristics of the liquid crystal display device, the liquid crystal material can be prevented from being deteriorated without altering the duty ratio of the gray scale signal in a separate step.

In the case where the duty ratios of a plurality of gray scale signals are altered, the alteration range of the duty ratio can be adjusted for each gray scale level, whereby the average value of the column electrode driving signal can be optimized for each gray scale signal.

In the case where the duty ratio of the digital gray scale signal is inverted in synchronization with at least one of an output period, a horizontal output period, or a vertical output period of a display digital data signal, the direction and amount of voltage variation of an average voltage of the column electrode driving signal due to the duty ratio adjustment, occurring for every cycle of the duty ratio inversion, can be made equal before and after the duty ratio inversion so as to prevent the voltage applied to the liquid crystal from varying. As a result, the flickering of display and the deterioration of the liquid crystal material can be prevented.

Moreover, the current consumption of the device can be prevented from increasing by altering the duty ratio in a continuous manner with respect to the gray scale signal waveform before the alteration of the duty ratio of the digital gray scale signal.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising:

a pair of opposing substrates with an electrooptical material sealed therebetween;

a plurality of pixel electrodes arranged in a matrix shape on one of the pair of substrates;

a plurality of switching elements, each of the plurality of switching elements being connected to one of the plurality of pixel electrodes;

a plurality of row electrodes, each of the plurality of row electrodes being connected to a control terminal of one of the plurality of switching elements;

a plurality of column electrodes, each of the plurality of column electrodes being connected to a signal input terminal of one of the plurality of switching elements;

a row electrode driving circuit for sequentially selecting and driving each of the plurality of row electrodes;

a digital gray scale signal generation circuit for generating a digital gray scale signal;

a row electrode driving circuit for receiving the digital gray scale signal and a source input having output levels of high and low and for outputting a column electrode driving signal having output levels of high and low, the output levels of high and low of the column electrode driving signal being switched at a cycle determined by the digital gray scale signal; and a timing control circuit for controlling the row electrode driving circuit and the column electrode driving circuit, wherein a duty ratio between a high level period and a low level period of the column electrode driving signal is selected to be a different value from a duty ratio of the digital gray scale signal.

2. A liquid crystal display device according to claim 1, wherein the column electrode driving circuit comprises conversion means for converting the duty ratio of the digital gray scale signal into a duty ratio between a high level period and a low level period of the column electrode driving signal different from the duty ratio of the digital gray scale signal.

3. A liquid crystal display device according to claim 1, wherein a plurality of digital gray scale signals are generated in the digital gray scale signal generation circuit, and the gray scale signal generation circuit comprises conversion means for converting the duty ratio of each of the plurality of the digital gray scale signals into a duty ratio between a high level period and a low level period of the column electrode driving signal different from the duty ratio of the digital gray scale signal.

4. A liquid crystal display device according to claim 1, wherein a plurality of digital gray scale signals are generated in the digital gray scale signal generation circuit, and conversion means for converting the duty ratio of each of the plurality of the digital gray scale signals into a duty ratio between a high level period and a low level period of the column electrode driving signal different from the duty ratio of the digital gray scale signal is provided between the gray scale signal generation circuit and the column electrode driving circuit.

5. A liquid crystal display device comprising:

a pair of opposing substrates with an electrooptical material sealed therebetween;

a plurality of pixel electrodes arranged in a matrix shape on one of the pair of substrates;

a plurality of switching elements, each of the plurality of switching elements being connected to one of the plurality of pixel electrodes;

a plurality of row electrodes, each of the plurality of row electrodes being connected to a control terminal of one of the plurality of switching elements;

a plurality of column electrodes, each of the plurality of column electrodes being connected to a signal input terminal of one of the plurality of switching elements;

a row electrode driving circuit for sequentially selecting and driving each of the plurality of row electrodes;

a row electrode driving circuit for receiving a plurality of digital gray scale signals and a source input having output levels of high and low and for outputting a column electrode driving signal having output levels of high and low, the output levels of the column electrode driving signal being switched at a cycle determined by each of the plurality of digital gray scale signals; and a timing control circuit for controlling the row electrode driving circuit and the column electrode driving circuit, wherein the column electrode driving circuit comprises conversion means for converting the duty ratio of each of the plurality of the digital gray scale signals into a duty ratio between a high level period and a low level period of the column electrode driving signal different from the duty ratio of the digital gray scale signal.

6. A method for driving a liquid crystal display device comprising:

a pair of opposing substrates with an electrooptical material sealed therebetween;

a plurality of pixel electrodes arranged in a matrix shape on one of the pair of substrates;

a plurality of switching elements, each of the plurality of switching elements being connected to one of the plurality of pixel electrodes;

a plurality of row electrodes, each of the plurality of row electrodes being connected to a control terminal of one of the plurality of switching elements;

a plurality of column electrodes, each of the plurality of column electrodes being connected to a signal input terminal of one of the plurality of switching elements;

a row electrode driving circuit for sequentially selecting and driving each of the plurality of row electrodes;

a digital gray scale signal generation circuit for generating a digital gray scale signal;

a row electrode driving circuit for receiving the digital gray scale signal and a source input having output levels of high and low and for outputting a column electrode driving signal having output levels of high and low, the output levels of high and low of the column electrode driving signal being switched at a cycle determined by the digital gray scale signal; and a timing control circuit for controlling the row electrode driving circuit and the column electrode driving circuit, wherein a duty ratio between a high level period and a low level period of the column electrode driving signal is selected to be a different value from a duty ratio of the digital gray scale signal.

7. A method for driving a liquid crystal display device comprising:

a pair of opposing substrates with an electrooptical material sealed therebetween;

a plurality of pixel electrodes arranged in a matrix shape on one of the pair of substrates;

a plurality of switching elements, each of the plurality of switching elements being connected to one of the plurality of pixel electrodes;

a plurality of row electrodes, each of the plurality of row electrodes being connected to a control terminal of one of the plurality of switching elements;

a plurality of column electrodes, each of the plurality of column electrodes being connected to a signal input terminal of one of the plurality of switching elements;

a row electrode driving circuit for sequentially selecting and driving each of the plurality of row electrodes;

a digital gray scale signal generation circuit for generating a digital gray scale signal;

a row electrode driving circuit for receiving the digital gray scale signal and a source input having output levels of high and low and for outputting a column electrode driving signal having output levels of high and low, the output levels of high and low of the column electrode driving signal being switched at a cycle determined by the digital gray scale signal; and a timing control circuit for controlling the row electrode driving circuit and the column electrode driving circuit, wherein a duty ratio between a high level period and a low level period of the column electrode driving signal is altered within one cycle of the column electrode driving signal.

8. A method according to claim 7, wherein the duty ratio is changed in a plurality of gray scale levels.

9. A method according to claim 7, wherein a period in which the duty ratio is altered and a period in which the duty ratio is not altered are provided within a duration n times as long as one cycle of the column electrode driving signal, wherein n represents an integer.

10. A method according to claim 7, wherein the duty ratio is adjusted for every cycle within a duration n times as long as one cycle of the column electrode driving signal, wherein n represents an integer.

11. A method according to claim 7, wherein a timing for altering the duty ratio of the digital gray scale signal is continuous with a timing of a rise or a fall of the column electrode driving signal.

12. A method according to claim 7, wherein the duty ratio of the digital gray scale signal is inverted in synchronization with at least one of an output period, a horizontal output period, or a vertical output period of a display digital data signal, a direction of voltage variation and an amount of voltage variation of an average voltage of the column electrode driving signal for inverting the duty ratio of the digital gray scale signal, occurring for every cycle of the duty ratio inversion, are made equal before and after the duty ratio inversion.

13. A method for driving a liquid crystal display device comprising:

a pair of opposing substrates with an electrooptical material sealed therebetween;

a plurality of pixel electrodes arranged in a matrix shape on one of the pair of substrates;

a plurality of switching elements, each of the plurality of switching elements being connected to one of the plurality of pixel electrodes;

a plurality of row electrodes, each of the plurality of row electrodes being connected to a control terminal of one of the plurality of switching elements;

a plurality of column electrodes, each of the plurality of column electrodes being connected to a signal input terminal of one of the plurality of switching elements;

a common electrode provided on the other one of the pair of substrates;

a row electrode driving circuit for sequentially selecting and driving each of the plurality of row electrodes;

a digital gray scale signal generation circuit for generating a digital gray scale signal;

a row electrode driving circuit for receiving the digital gray scale signal and a source input having output levels of high and low and for outputting a column electrode driving signal having output levels of high and low, the output levels of high and low of the column electrode driving signal being switched at a cycle determined by the digital gray scale signal; and a timing control circuit for controlling the row electrode driving circuit and the column electrode driving circuit, wherein, when driving the liquid crystal display device by using the column electrode driving signal, the digital gray scale signal generated by the gray scale signal generation circuit is adjusted so as to have a duty ratio such that a voltage of the column electrode driving signal with respect to the common electrode has the same value in a period when the column electrode driving signal applied to one the plurality of pixels has a positive polarity or in a period when the column electrode driving signal applied to one the plurality of pixels has a negative polarity.

* * * * *